Oct. 16, 1956  B. McCOLLUM  2,767,389
SEISMIC EXPLORATION APPARATUS
Filed Nov. 13, 1950  3 Sheets-Sheet 1

Burton McCollum
INVENTOR.

BY Lewis H. Wilson
ATTORNEY

Oct. 16, 1956            B. McCOLLUM            2,767,389

SEISMIC EXPLORATION APPARATUS

Filed Nov. 13, 1950            3 Sheets-Sheet 2

Burton McCollum
INVENTOR.

BY Lewis H. Wilson

ATTORNEY

Burton McCollum
INVENTOR.

BY Lewis H. Wilson
ATTORNEY

United States Patent Office 2,767,389
Patented Oct. 16, 1956

2,767,389

SEISMIC EXPLORATION APPARATUS

Burton McCollum, Houston, Tex.

Application November 13, 1950, Serial No. 195,377

4 Claims. (Cl. 340—15)

This invention relates to apparatus for exploring subsurface geology by means of seismic waves, and more particularly to a novel apparatus for recording seismic waves.

Forming a part of this invention are the accompanying drawings wherein.

Figure 5:

Figure 5 graphically illustrates a seismic record as obtained according to this invention by a single recording of a recurrent event in the presence of stray events.

Figure 6:

Figure 6 graphically illustrates a seismic record as obtained by making five repetitions of the record of Fig. 5 and integrating said records into a single record, as explained hereinafter.

Figure 7:

Figure 7 graphically illustrates a seismic record as obtained according to the technique of Figure 6, except that twenty-five records were made and integrated into a single record.

Figures 8, 9:
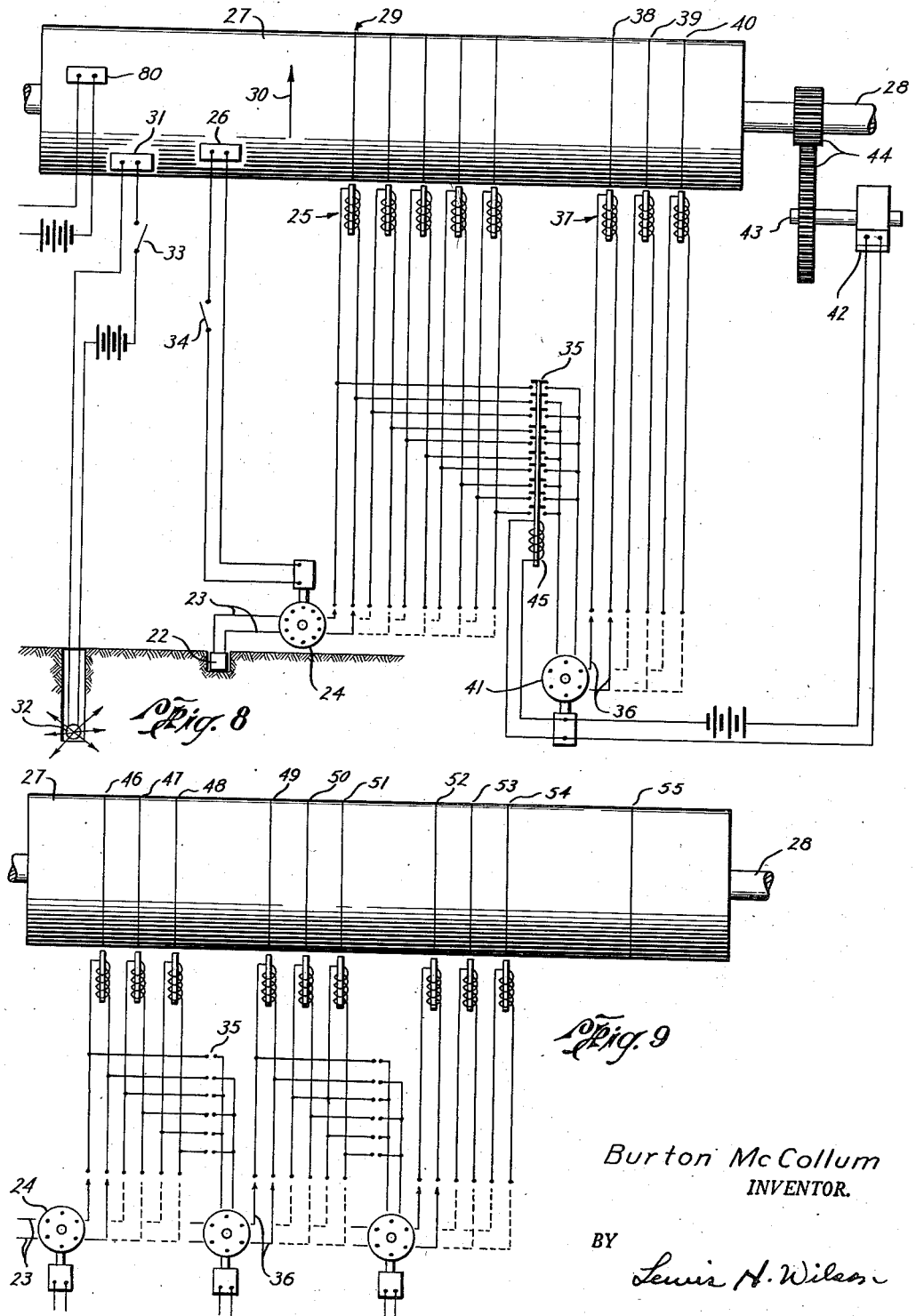

Figure 8 is a schematic illustration of my integrating recorder device in combination with a conventional means for generating seismic waves.

Figure 9 is a modified form of my integrating recorder preferred for certain applications hereinafter explained.

Figure 1:
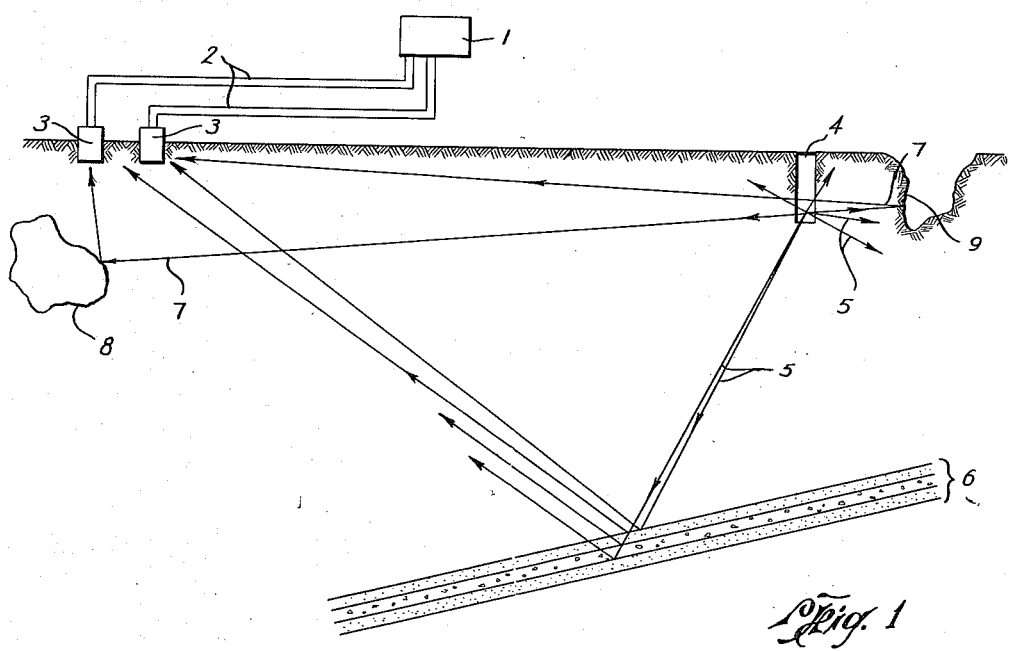
Figures 1 and 2 illustrate the basic principles heretofore employed in seismic explorations and are referred to hereinafter to exemplify the major drawbacks encountered with prior art techniques.

A number of difficulties encountered which seriously limit the utility and accuracy of conventional seismic prospecting techniques will be more readily understood by discussing with reference to Figure 1 of the drawings illustrating such prior art techniques. A recording device 1 is connected by wires 2 to a plurality of detectors 3. An explosive charge is fired in a shot hole 4. The elastic wave generated by the shot travels in all directions, as represented by the waves 5. Whenever these waves encounter boundaries characterized by material variations in density or elastic properties of the earth, a portion of the wave energy is reflected, the magnitude and direction of the propagation of such reflected waves being governed by well-known laws. In general, waves will be reflected from stratigraphic boundaries 6. The depth and contour of the strata can be determined by detecting and recording the travel times between the shot and the detectors, provided the reflected events are sufficiently clear and definite. It is these relatively vertical components of the wave which are useful to the geophysicist in exploring subsurface stratigraphy.

One major difficulty of the above described method results from the fact that reflections are derived not only from the vertically traveling waves 5, but the components 7 of the wave traveling in a relatively horizontal direction also encounter reflecting boundaries such as 8 and 9. Such boundaries 8 may be caused by local variations in physical properties resulting from interbedding of sands, shales, clays, rocks, and the like. Boundaries 9 may be caused by sharp erosional surface or subsurface boundaries. The events reflected from these boundaries travel in a relatively horizontal plane and are often very numerous and of considerable magnitude. They frequently completely obscure the useful events reflected from the strata it is desired to explore. Even when the useful events are not entirely obscured, the interference of the two groups of waves produces distortions and phase displacements that confuse the geophysicist and often cause serious errors in interpretation.

Another serious drawback of known methods arises from the fact that the wave lengths generated by the shots are so long in relation to the thickness and spacing of the strata under investigation that what appears to be a record of a single event usually will be a composite of several reflected events from a plurality of reflecting boundaries. In consequence, any modification of one or more of these boundaries will cause distortions and displacements in the composite wave which are often misinterpreted, thus leading to altogether erroneous findings.

Figure 2:
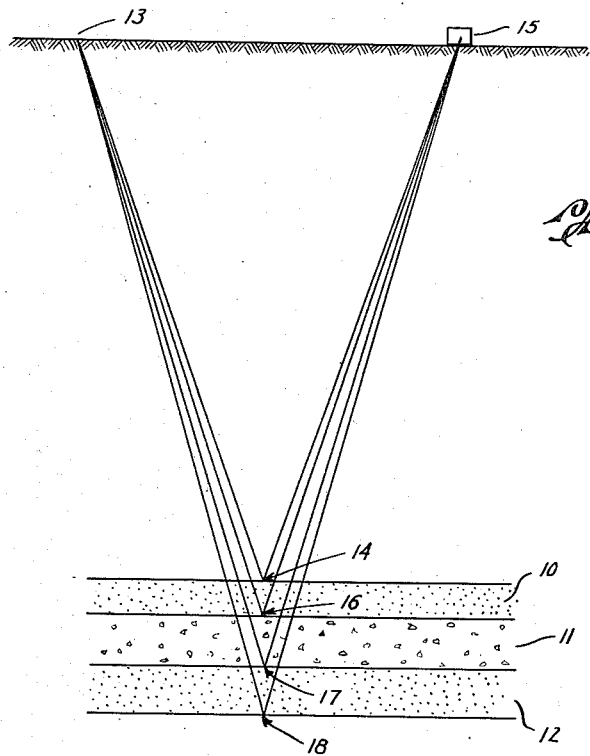

The importance of wave length to the quality of records is clarified with reference to Figure 2 of the drawings. Here there are shown three adjoining strata 10, 11 and 12. A seismic wave originating at 13 will have a certain component of the wave energy reflected by the boundary 14 to a detector 15. Generally, reflected events are produced at boundaries 16, 17 and 18, all of which actuate the detector 15 in sequence. If the wave length of the seismic pulse is sufficiently short, the record of events detected by detectors 15 will show four separate and distinct events such that any variation in thickness, dip, or depth of any of the horizons will be made apparent by the record. If, however, the wave length is too long, reflected events from boundaries 16, 17 and 18 will all arrive at detector 15 before the record of the reflected event from boundary 14 is completed. Thus all four events merge into a single composite record causing confusion of the events and resulting in lack of recognizable character, which makes correlation between successive stations difficult or impossible. It is for this reason that it is very desirable to use wave lengths just as short as possible.

In considering the facors that determine the wave lengths of seismic waves, it must be appreciated that any seismic pulse may be regarded as being a composite embracing almost an unlimited number of wave lengths, but usually the greater part of the wave energy is carried by the fundamental component. Therefore, of primary concern are those factors which determine the wave length of the major energy carrier. The seismic wave length of the fundamental component is determined chiefly by (1) the acoustic properties of the medium in which the wave is generated, such as the elasticity and density of the medium, and (2) the magnitude of the impact used to generate the wave. In general high rigidity yields short wave lengths and high density yields long wave lengths, and the wave length varies directly with the magnitude of the impact. An important factor is the disruptive effect which invariably results from conventional shooting. This effect is particularly pronounced when the charges are fired in soft and unconsolidated formations near the surface in which, for economic reasons, most shot holes terminate. These disruptive effects not only produce long wave lengths, but also dissipate a large part of the energy of the shot.

It is the object of the present invention to provide the recording apparatus which will enable the geophysical surveyor to overcome the foregoing drawbacks of the prior art. In accomplishing this purpose it is a further object to provide a practical way of utilizing relatively weak impacts for generating seismic waves, thereby avoiding disruptive effects and shortening the wave lengths. The above objects will be understood more clearly and further objects will be apparent from the description of this invention given hereinafter.

An exploration technique made possible, or at least materially improved, by the use of this invention now will be described with reference to the accompanying drawings wherein identical elements are indicated by like reference numerals. This technique is described to illustrate a use of the invention and is not intended as a limitation thereof.

Figure 3:
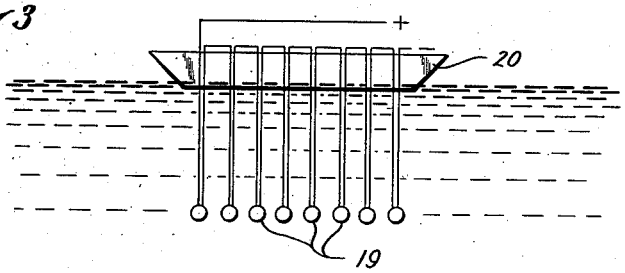
Figure 3 shows one method of arranging the shots used to generate seismic waves for marine operations.
Figure 4:
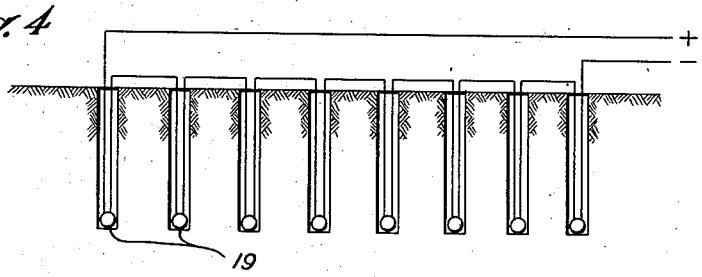
Figure 4 shows an alternative arrangement of these shots for use in land operations.

The technique for generating seismic waves chosen as an example comprises using a large number of conventional explosive charges substantially reduced in magnitude and spaced apart preferably in a horizontal plane. In marine operations this can be accomplished by suspending the charges 19 from a floating framework 20 such as a barge or boat (Figure 3). In land operations each shot 19 is placed in a separate shot hole (Figure 4). The shots are all connected to a common electric circuit 20 and fired simultaneously by well-known means.

It is desirable to subdivide the total charge of conventional explosive so that any one of the individual component charges will be too small to cause the medium immediately surrounding the charge to be strained beyond its elastic limit, or beyond the limit where strain is proportional to stress. Under such conditions disruptive effects are avoided and the small charges generate seismic waves of lengths much shorter than would be derived if the entire charge were fired as a single undivided unit. The degree of subdivision will vary, depending upon the elastic limit of the material immediately surrounding the charges. The degree of subdivision required in any general area can best be determined by actual trial. I have obtained good results by subdividing the total charge of conventional explosive into from ten to fifty units. Thus, whereas the usual charge may range from about a pound upwards to several pounds or more, I may use, e. g., a fraction of an ounce in each of the individual component charges.

As my invention I have developed and succesfully employed a means of utilizing very small impacts which substantially avoids the prior art difficulties mentioned hereinbefore and otherwise greatly speeds the field procedure in both land and marine operations. This involves the development and use of a device which I refer to herein as an integrating recorder, a device which records and integrates a large number of very weak but synchronously repeated or recurrents events. By the expression "synchronously repeated or recurrent events" I mean those events derived from successive records which are repeated according to a definite and unchangeable time pattern. This produces a composite record in which the repeated events are additive and hence appear in much greater magnitude than any of the individual component events. Instead of making a complete record with a single shot of sufficient magnitude to override most of the disturbance caused by normal earth movements, as has been the customary procedure heretofore, I use a very small unit charge or other very weak impact to generate the seismic wave. This avoids the objectionable disruptive effects and makes it possible to radiate the energy on shorter wave lengths than is possible with conventional procedures under otherwise identical conditions. By repeating this operation a sufficient number of times and integrating the numerous small events into a composite record, two important ends are achieved, namely; (1) those relatively weak events which recur according to a definite time pattern are cumulative, and in the composite record are of much greater amplitude than on any of the plurality of individual records from which the composite record is made; and (2) the undesirable events, due to fortuitous earth movements and other so-called stray events, are not cumulative. To the contrary there is a tendency toward cancellation of such stray events by the integrating process, because of frequent super-position of positive and negative phases, with the result that the resultant composite record has an amplitude at any given time point which amplitude is substantially proportional to the algebraic sum of the amplitudes of all the individual primary records at the corresponding time point with respect to the beginning of the records. Thus the integrating step simultaneously multiplies the useful events, and minimizes the undesirable events.

Figures 5, 6 and 7 illustrate the power of the integrating recorder to increase the ratio of signal (useful events) to noise level (stray events). Figure 5 shows a single record of a recurrent event 21 in the presence of a noise level so high that the event is entirely unrecognizable. Figure 6 shows a composite record of five repetitions of a record of the type of Figure 5. That is, the record of Figure 6 was made by integrating (by the integrating recorder of this invention) five records of the type of Figure 5 into a single record. In Figure 6 the recurrent event 21 is just becoming recognizable, although still in distorted form. Figure 7 shows a composite of 25 repetitions of a record of the type of Figure 5. In Figure 7 the recurrent event 21 is greatly amplified and stands out clearly, while the noise level is greatly reduced.

With my integrating recorder I am able to use a much smaller impact for generating the seismic wave than has heretofore been possible, and thereby realize the benefits outlined herein. One embodiment of my integrating recorder is shown in Figure 8. A detector unit 22 is connected by the wires 23 through any suitable conventional filter-amplifier unit (not shown) to the recorder equipment. A step switch 24 connects the wires 23 to successive recorder heads of the group 25 as each record is taken. The step switch 24 is actuated once each revolution of a recorder drum 27 by the electrical contact 26 mounted on the recorder drum. The recorder drum is rotatable about an axis 28 at any desired predetermined constant speed. A group of recorder channels 29 are mounted on the drum. Each revolution of the recorder drum switches the circuit 23 to the next succeeding recorder channel as indicated.

In starting the operation, the first shot is loaded and the recorder drum set in rotation (e. g. by means of an electric motor, not shown), the several electrical contacts shown moving in the direction indicated by the arrow 30. The actuating contact 26 first makes the circuit which actuates the step switch 24 and connects the line 23 to the first of the recorder heads 25. An instant later the contact 31 is made which fires the shot or explosive charge 32, and the record of the shot is made on the first of the recorder channels 29. The equipment then can be made inoperative while the next shot is being loaded by opening the switches 33 and 34. As soon as the shot is reloaded, these two switches are again closed, and on the next succeeding revolution of the drum the second shot is fired and the record made on the second of the recording channels 29. This operation is repeated as many times as desired.

Next the recording channels 29, each of which carries a repetition of a similar record, are all coupled together in any of many well-known possible ways, as e. g., by parallel grouping shown in principle by the closing of the gang switch 35, and during the next revolution of the drum a composite of all the records is delivered to the circuit 36 from which it is delivered to the recorder head 37 and recorded on a storage channel 38, where it may be stored until it is desired to convert it into a photographic record for analysis. Similarly, successive groups of records taken at the same station, or at different stations, may be integrated and recorded on successive storage channels 39 and 40 with the aid of another step switch 41 whereby the leads 36 are moved successively to the proper recording channels.

The frequency of operation of the step switch 41 will depend on the number of recording channels in the group 29. If there are N of such recorder channels in the group, the step switch 41 will be required to operate only once in N revolutions of the recording drum 27. This is most simply accomplished by placing the contact 42, which operates the step switch 41, on a countershaft 43 which is geared to the recorder drum by the gears 44 having a reducing ratio of N. The contact 42 may also be used to actuate the gang switch 35, as indicated schematically, as by energizing the solenoid 45. By the term "gang switch" as used herein is meant any suitable means by which a plurality of electrical circuits can be combined or coupled into a single electrical circuit. The term is well understood in the art.

After making the composite record as described above, the records on the group of channels 29 are erased by conventional means and made ready for a repetition of the operation. As one of many devices that may be used for automatically controlling the erasing process and properly timing the same, the control contact 42 may also be used to energize the erase heads (not shown). This is particularly applicable since it is preferred to erase the records immediately after the making of the composite and during the same revolution of the recorder drum. For erasing, the contact 42 should be kept made over a period slightly less than one revolution of the recorder drum 27.

Instead of energizing the erase heads by means of contact 42, they may be energized through the medium of a separate contact (not shown) associated with the recorder drum. The process of erasing is so well understood in the art that no description is necessary here.

At any time, or course, any or all of these stored records may be converted into photographic records by reproducing them into the input circuit of any of many well-known types of photographic recorders, the procedure being well known in the art.

Any of several types of recorders may be used, such as for example mechanical, photographic or magnetic types, but I prefer to use a recorder of the magnetic type. Such recorders are standard devices and the switching devices required are well-known types. They are briefly described here only for completeness to illustrate the principle of my invention, and I do not limit myself to any particular type of recorder or means of performing the switching and transfer operations.

In the integrating recorder shown in Figure 8, a separate recorder channel is required for each shot recorded for the purpose of integration. This type of integrating recorder is desirable when a small number of shots are to be integrated. However, if a large number of shots are to be integrated, a modified type of integrating recorder illustrated in Figure 9 is preferred, since it gives a simpler, more compact, and less expensive instrument for this application. This modified type involves what may be called group recording, which makes it possible to record and integrate a very large number of shots with relatively few recording channels. In this method the recording channels are arranged in groups (Figure 9). For illustration purposes there are shown three groups with each group comprising three recording channels. In practicing this invention with this modified integrating recorder, the first three records are made in order on the first group of recording channels 46, 47 and 48, the procedure being the same as that described above with reference to Figure 8. The composite of these three records next is made and recorded on channel 49 in the same manner as illustrated in Figure 8. Then the records on channels 46, 47 and 48 are erased by conventional means and are ready to receive another group of three shots. When those are taken, the composite of the three is recorded on channel 50. Similarly, after again erasing the records on channels 46, 47 and 48, a third group is recorded and a composite made on channel 51. There is now a total of nine records, in the form of three composites each, on channels 49, 50 and 51.

Following the procedure described above, a composite of these nine is made and the resulting composite recorded on channel 52, after which the records from channels 49, 50 and 51 are erased to make them available for subsequent repetitions of the operation. The above operation is repeated successively and another composite of nine records is recorded on each of the channels 53 and 54, after which a composite of the entire twenty-seven records may be made on channel 55 for future use or, as indicated hereinbefore, it may be converted into a photographic record for geophysical analysis.

With the above illustration a record of twenty-seven shots can be made with only nine channels. Thus if X groups of recording channels are employed, each group containing Y individual channels, the total number of channels will be X multiplied by Y or XY. The total number of shots that can be integrated into a single composite record then will be Y raised to the power X or $Y^x$. Using this formula in the above illustration wherein X equals three and Y equals three, it is found that nine channels are sufficient to integrate twenty-seven shots, or three shots per channel. If X equals five and Y equals five, the twenty-five channels will record and integrate 3,125 shots or 125 shots per channel. Thus the number of shots per channel that can be recorded and integrated increases very rapidly as X and Y are increased.

In the above illustration X was assumed to be equal to Y, but this is not a limitation since the two are independent variables. Actually the maximum number of integrations per recording channel becomes greatest when X exceeds Y.

In the foregoing specification, I have made reference to only a single detector station, which would preferably embrace a plurality of individual detector elements, spaced apart and so connected as to function as a single detector unit. It will be obvious that I may use a plurality of such detector groups spaced apart, as along a line or in other suitable orientation. In order to use a plurality of such detector groups, it is only necessary to add additional sets of recorder channels which would function in the same manner as described hereinbefore.

As many apparently widely different embodiments of this invention may be made without departing from the spirit and scope thereof, it is to be understood that the invention is not limited to the specific embodiments thereof except as defined in the appended claims.

What is claimed is:

1. Apparatus for recording sequentially detected seismic waves and automatically integrating the resulting records, comprising a recorder drum, means for rotating said drum about an axis at any desired predetermined constant speed, a group of recording channels on said drum, means for recording on said channels the signals representative of sequentially detected waves, means for switching said signals to successive recording channels after each record is made, an additional recording channel on said drum, and means for connecting the entire group of recording channels to said additional recording channel on said drum to make a composite record on said additional channel of all the individual records on said group of recording channels.

2. In combination, apparatus for recording seismic wave impulses and integrating the resulting geophysical records, comprising a group of recorder heads, a recorder drum, means for rotating said drum about an axis at any desired predetermined contant speed, a group of recording channels on said drum opposite and corresponding in number to the recorder heads, electrical contact means on said drum for switching the incoming wave impulses to successive recorder heads once each revolution of the drum after each record is made on the corresponding recording channels, an additional recording channel movable at any desired predetermined speed, and switching means for connecting the entire group of recording channels to said additional recording channel to make a composite record on this single channel of all the individual records on said group of recording channels.

3. An integrating recorder of the class described, which comprises means for recording electrical signals from an incoming signal circuit, said means including a recording drum capable of being driven at any desired predetermined substantially constant speed, a plurality of recording channels on said drum, and recording head means for recording said signals on said recording channels; means associated with said recording head means for shifting the said signal circuit progressively from one recording channel to the next channel in order after each series of signals has been recorded on the immediately preceding channel; and a switching device for coupling the channels in which the several series of signals have been recorded to reproduce said signals from said individual channels as a single composite record on which the amplitude of the resulting signal at any given time point on said composite record is substantially proportional to the algebraic sum of the amplitudes of said individual records at the corresponding time points with respect to the beginning of the records.

4. An integrating recorder of the class described, which comprises means for recording electrical signals from an incoming signal circuit, said means including a recording drum capable of being driven at any desired predetermined substantially constant speed, a plurality of recording channels on said drum, and corresponding recording heads for recording said signals on said channels; a step switch for shifting said signal circuit progressively from one recording channel to the next channel in order after each series of signals has been recorded on the immediately preceding channel; a gang switch for coupling all of the channels in which the several series of signals have been recorded; and electrical contacts mounted on said drum for actuating said step switch and said gang switch to reproduce said signals from all of said individual channels as a single composite record on which the amplitudes of the resulting signal at any given time point on said composite record is substantially proportional to the algebraic sum of the amplitudes of all of said individual records at the corresponding time points with respect to the beginning of the records.

References Cited in the file of this patent

UNITED STATES PATENTS

| | | |
|---|---|---|
| 1,049,735 | Kowastch | Jan. 7, 1913 |
| 1,843,572 | MacGahan | Feb. 2, 1932 |
| 2,018,737 | Owen | Oct. 29, 1935 |
| 2,083,706 | Harris | June 15, 1937 |
| 2,088,588 | Dudley | Aug. 3, 1937 |
| 2,144,812 | Rieber | Jan. 24, 1939 |
| 2,155,507 | Rieber | Apr. 25, 1939 |
| 2,206,927 | Turnbull et al. | July 9, 1940 |
| 2,248,587 | Seavey | July 8, 1941 |
| 2,348,411 | Petty | May 9, 1944 |
| 2,353,484 | Merten et al. | July 11, 1944 |
| 2,394,990 | Eisler et al. | Feb. 19, 1946 |
| 2,427,421 | Rieber | Sept. 16, 1947 |
| 2,514,578 | Heller et al. | July 11, 1950 |
| 2,573,748 | Weinstein et al. | Nov. 6, 1951 |
| 2,580,636 | Wolf | Jan. 1, 1952 |
| 2,586,706 | Parr, Jr. | Feb. 19, 1952 |
| 2,615,522 | Poulter | Oct. 28, 1952 |
| 2,620,890 | Lee et al. | Dec. 9, 1952 |
| 2,679,205 | Piety | May 25, 1954 |

FOREIGN PATENTS

| | | |
|---|---|---|
| 24,172 of 1893. | Great Britain | Oct. 20, 1894 |